United States Patent [19]

Adie

[11] 4,133,766
[45] Jan. 9, 1979

[54] FILTER MEDIA SUPPORT AND CONTAINMENT SYSTEM

[75] Inventor: Richard A. Adie, Sykesville, Md.

[73] Assignee: Koppers Company, Inc., Pittsburgh, Pa.

[21] Appl. No.: 776,722

[22] Filed: Mar. 11, 1977

[51] Int. Cl.² .................. B01D 29/08; B01D 29/38
[52] U.S. Cl. .................................. 210/275; 210/289; 210/293
[58] Field of Search ............... 210/264, 275, 283, 284, 210/285, 286, 289, 291, 293

[56] References Cited

U.S. PATENT DOCUMENTS

| | | | |
|---|---|---|---|
| 2,093,370 | 9/1937 | Sebring | 210/284 |
| 2,302,449 | 11/1942 | Laughlin | 210/285 |
| 2,302,450 | 11/1942 | Laughlin | 210/264 |
| 3,771,655 | 11/1973 | Hudson | 210/264 |
| 3,984,326 | 10/1976 | Bendel | 210/264 |

Primary Examiner—Thomas G. Wyse
Assistant Examiner—Ivars Cintins
Attorney, Agent, or Firm—Herbert J. Zeh, Jr.; Oscar B. Brumback

[57] ABSTRACT

The invention discloses an improved granular media filter of the type including a filter tank, means for dividing the tank into a plurality of cells, means within each cell for holding horizontal porous support plates, a bed of filter media on the porous support plates, influent means for delivering fluid to be treated to the top of the filter bed, filtrate receiving means in each cell below the support plates for receiving the treated fluid, an effluent channel for removing the treated liquid from the filter, port means for delivering the treated liquid from each filtrate receiving means to the common effluent channel and backwashing means that cooperate with the port means to force a backwashing liquid back through the port means and filtrate receiving means and up through the filter bed for removing contaminants therein and thereon. The improvement comprises a prefabricated lightweight plastic cell system that divides the filter into the plurality of cells, provides horizontal support means for the porous plates, provides the filtrate receiving means and provides the port means. Filters using the lightweight prefabricated cell system of the present invention are less expensive and easier to install and have improved properties compared to prior art filters.

19 Claims, 11 Drawing Figures

FILTER MEDIA SUPPORT AND CONTAINMENT SYSTEM

BACKGROUND OF THE INVENTION

The present invention is directed to the art of filtering solids from liquids, particularly to granular media filters. More particularly, this invention is directed to an improved multi celled granular media filter having a prefabricated plastic cell system.

The use of multi celled granular media filters for removing suspended solids from liquids is well known in the art. Generally, such a filter comprises a filter tank, means for dividing the tank into a plurality of cells, means within each cell for holding horizontal porous support plates, a bed of filter media on the porous support plates, influent means for delivering liquid to be treated to the top of the filter bed, filtrate receiving means in each cell below the porous plates for receiving the treated liquid, an effluent channel for removing the treated liquid from the filter, port means or filtrate outlet means for delivering the treated liquid from each filtrate receiving means to the common effluent channel and backwashing means that cooperate with the port means to force a backwashing liquid back through the port means and fluid receiving means and up through the filter bed for removing contaminants therein and thereon.

The general operation of this type of filter is as follows. Influent liquid containing suspended solids is evenly distributed across the top of the filter bed in the various cells. The contaminated liquid then percolates through the filter bed and the bed traps and thereby removes the suspended solids from the liquid. The filtered liquid then passes through the porous support means and into the filtered liquid receiving means. The filtered liquid then flows through the port means and into the effluent channel. When the contaminated material has become lodged in the upper portion of the filter bed, the rate of flow is appreciably decreased and it is necessary to backwash the filter. The backwashing may also be done in accordance to a timed sequence that washes the cells before they become so clogged as to greatly reduce the flow rate. The backwashing is preferably controlled by a combination of a timing sequence and the flow rate or liquid level. Backwashing is generally accomplished by pumping a washfluid, generally the treated liquid, from the effluent channel back through the port means and filtrate receiving means and up through the porous support means and the filter bed to remove the accumulated contaminated materials. The backwashing fluid is removed from the filter by a backwash fluid removal means. The backwashing is done on a cell by cell basis. One cell is backwashed while the remaining cells are filtering contaminated liquid.

Many different variations of the above type general filtering aparatus have been developed over the years. See for example Sebring, U.S. Pat. No. 2,093,370; Laughlin, U.S. Pat. Nos. 2,302,449 and 2,302,450 and Horning, U.S. Pat. No. 3,279,061. The present invention is concerned with an improvement to such filters, particularly those described by Laughlin and Horning. The success of such filters to a large extent depends on the ability to backwash one cell or perhaps several cells while keeping the remaining cells filtering contaminated liquid. Accordingly, a large part of the cost of installing such multi cell filers is associated with the apparatus for dividing the filters into a plurality of cells that can be individually backwashed and the cost of installing the same. The present invention provides a prefabricated lightweight plastic cell system for multi cell granular media filters that is less expensive than the prior art and is easier to install.

SUMMARY OF THE INVENTION

The present invention provides an improved cell system for multi cell granular media filters. The improved cell system is a prefabricated lightweight cell system that divides the filter into a plurality of individual cells, provides the horizontal support means for the porous plates, provides the treated fluid receiving means, provides a port means between the treated fluid receiving means and the effluent channel and provides a surface for engagement with the backwash means. The improved cell system is easier to install than the prior art system and is less expensive to manufacture and ship.

The prefabricated cell system of the present invention may be more readily understood with reference to the following figures.

Figure 1:
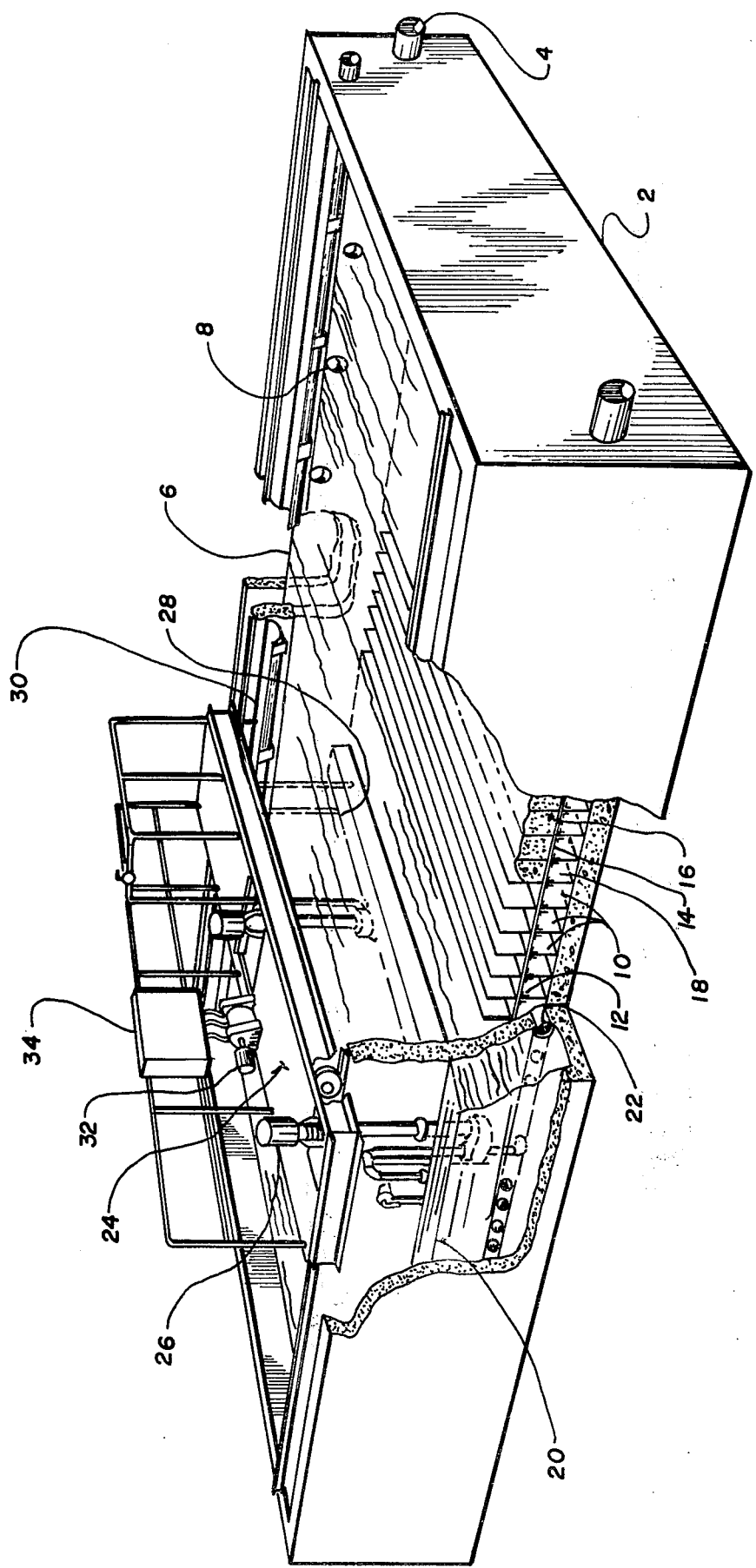
FIG. 1 is a perspective view with sections broken away illustrating the prior art type of filter to which the present invention is an improvement.

With respect to FIG. 1, there is provided a filter 2. The filter has an influent line 4 and an influent channel 6 bringing the contaminated fluid into the filter. There is provided a plurality of inlet ports 8 for evenly distributing the influent liquid to the plurality of filter cells. The filter is divided into a plurality of cells by cell sheets 10. Cell sheets 10 also have support means 12 attached to the sides thereof for supporting porous plates 14. A bed of granular filter media 16 is supported on the porous plates. The cell sheets also form a plurality of filtrate receiving means 18 under each filter cell. The filter has an effluent channel 20 for receiving the treated liquid and a plurality of effluent ports 22 for delivering the treated fluid from the filtrate receiving means to the effluent channel. The filter is also provided with backwashing mean 24 for cleaning the contaminated filter cells. The backwash means has associated therewith a means for pumping 26 the backwash fluid (filtered liquid) from the effluent channel back through the effluent port means, into the filtrate receiving means, up through the porous plates and filter bed. The backwash mean also has provided therewith a backwash receiving means 28 that cooperates individually with each filter cell to receive the backwash fluid. The backwash receiving means takes the backwashing fluid to a backwash discharge means 30 which removes the backwash fluid for disposal. The filter also has a means 32 for moving the backwash means for cooperation with the individual filter cells and a means 34 for controlling the operation of the backwashing means As can be realized by one of ordinary skill in the art, the dividing of the filter into a plurality of filtering cells with individual filtrate receiving means that cooperate with the effluent channel and backwashing means to individually backwash the filter cells is essential to the usefulness of the filter. The present invention is directed to a lightweight prefabricated plastic cell system that divides the filter into a plurality of cells, provides horizontal support means for the porous plates, provides the filtrate receiving means, provides for the effluent port means, and provides for a surface to engage the backwashing means. Filters employing the lightweight plastic cell system of the present invention are easier to install and are less costly than prior art filters.

Figure 3:
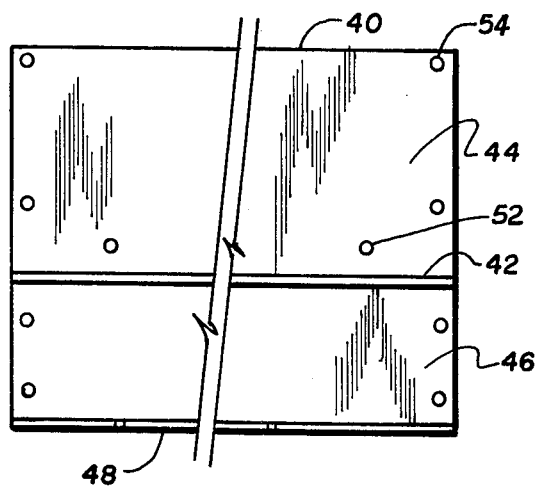
FIG. 3 is a side view of a cell sheet of the present invention.
Figure 2:
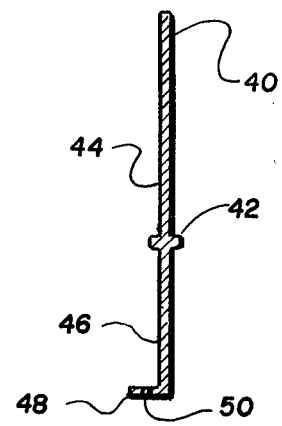
FIG. 2 is an end view of a cell sheet of the present invention.
Figure 5:
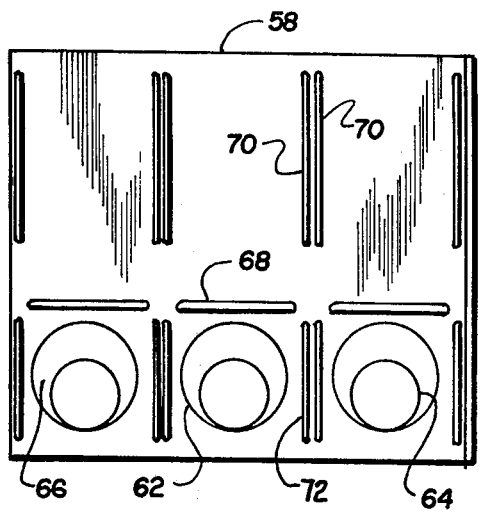
FIG. 5 is an end view of the port means or filtrate outlet means of the present invention.
Figure 4:
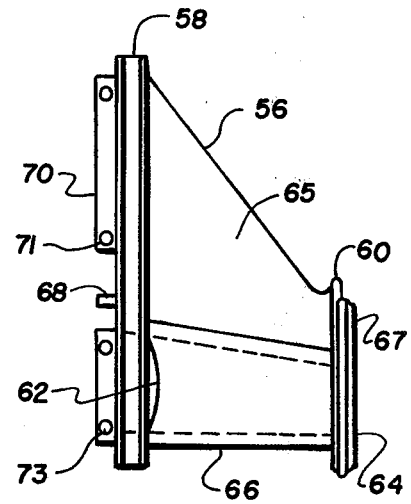
FIG. 4 is a side view of the port means or filtrate outlet means of the present invention.

With respect to FIGS. 2 and 3, there is illustrated one of the plurality of main cell sheets 40 of the cell system of the present invention. The main cell sheets are used to divide the filter into a plurality of sections or cells. The cell sheets preferably extend the entire width of the filter that is from the interior of the effluent channel wall to the interior of the influent channel wall. It should be realized however that the cell sheet may be made in several sections that are in some manner spliced together.

The cell sheets have a shoulder or ledge 42 symmetrically projecting out each side thereof. The shoulders extend the entire length of the cell sheet and provide a horizontal support for the porous filter plates. The shoulders or support means are an integral part of the cell sheets and they divide the cell sheets into an upper part 44 and lower part 46. The upper part of the cell sheets divide the filter bed into a plurality of cells for containment of the filter media, while the lower part forms a plurality of filtrate receiving means.

The lower part of the cell sheets have integral foot means 48 for attaching the cell sheets to the floor of the filter. The foot means have a plurality of openings 50 therein for keying the cell sheets to leveling strips affixed to the floor of the filter. The keying means are preferably a hole in the foot means through which a self-threading bolt passes. The bolt is affixed to the leveling strip that is attached to the filter floor (shown in more detail in FIG. 10).

The upper portion of the cell sheet has a plurality of holes 52 evenly spaced along the length thereof and located above the shoulders. The holes are for attaching plate holding means that hold the porous filter plates firmly against the shoulders, particularly during backwashing. The plate holding means is generally an angle shaped piece of material that is bolted to the cell sheet after the plates are in position on the shoulders. Other means for holding the porous plates against the shoulders are acceptable and within the scope of this invention. Such plate holding means may be keyed to the cell sheets in any known manner.

The cell sheets also have a plurality of perforations 54 vertically spaced along each end edge of the cell sheet. The vertical edge perforations are for attaching the cell sheet to the cell end section at the influent side of the filter and to the filtrate outlet port means at the effluent side of the filter.

The cell sheet is fabricated from a reinforced polyester or some other reinforced plastic material. The preferred material is glass-reinforced polyester. The filter cell has integral shoulders and an integral foot means that are formed as the cell sheet is formed. The easiest method for forming cell sheets of such design is by pullextrusion using glass-reinforced polyester. This process makes it possible to fabricate thin cell sheets with the necessary integral shoulders to hold up the media support plates and with the integral foot means for attaching the cell sheets to the leveling strips. By properly choosing the plastic material and reinforcing material, excellent material porperties and compatibility with the concrete filter (or other filter material) may be achieved. The reinforced plastic cell sheets are far stronger and stiffer than non-reinforced materials and greatly resist sagging or cracking with age, heat or cold. By using a high reinforcing glass content, thermal expansion of the cell sheets closely follows that of concrete, thus keeping thermal stress to a minimum. Because of the flexibility in selecting the plastic composition the cell sheets can be made not to corrode, rust, or peel and to require no pre-installation coating or post installation maintenance. The unique feature of the cell sheet is its cross section with projecting shoulders and integral foot. This combines the prior art multiple piece cell sheet, media support member and leveling strip attachment functions into one unified shape and eliminates the need for tie rods between cell sheets. This greatly reduces field assembly. Also, the shipping charges are greatly reduced because the plastic is much lighter weight than the heretofore metal cell sheets and the plastic is less expensive than the metal.

For most standard filters the cell sheet is about ¼ inches thick, however, as is realized it can made thicker or thinner. The cell sheet is about 20 inches high. It may be necessary to make the cell sheet considerably higher if a deeper bed of filter material is desirable or if a filter using more than one media is being used. The foot means is generally from 1 to 3 inches preferably around 1¼ inches wide. The shoulder means project out about ⅜ inches on each side of the cell sheet. The projection may be increased or decreased, however, care must be taken to make sure the shoulders project enough to adequately support the porous plates and filter media particularly during filtration. The length of the cell sheet depends on the width of the filter. The cell sheet extends the entire width of the filter which may be anywhere from about 6 to 30 feet.

With respect to FIGS. 4, 5, 6 and 7 there is illustrated one of a plurality of effluent port means or filtrate outlet means of the cell system of the present invention. The effluent port means 56 is comprised of a rectangular front panel 58 a rectangular rear panel 60 preferably of smaller height than the front panel. The front panel has a plurality of circular openings 62 in the lower section thereof and the rear panel has a plurality of corresponding circular openings 64 in the lower section thereof. The openings in the rear panel preferably being smaller than the openings in the front panel. A plurality of cylindrical tubes 66 extend from each opening in the front panel to the corresponding opening in the rear panel. Preferably the cylindrical tube is tapered. The filtrate outlet means also has a plurality of tapered reinforcing plates 65 extending from the front panel to the rear panel above each tube. The plates are tapered from the top of the front panel to the top of the rear panel. The rear panel also has an offset surface 67 for engagement of the backwashing means. During installation the surface of rear panel 60 is set flush against the effluent channel wall and the offset surface 67 provides a smooth surface for engagement of the backwashing means so that it does not ride along the concrete surface of the channel wall. It is possible to construct the effluent port means by fabricating the front panel, rear panel cyindrical portions, reinforcing panels and offset surfaces in two or more pieces and then assembling them, however, it is preferred that the effluent port means be constructed as a unitary piece, all parts being integral.

The effluent port means has a plurality of horizontal ledges 68 projecting from the front side of the front panel. The horizontal ledges are similar to the shoulders of the cell sheet. The ledges are for holding the porous plates at the end of the effluent outlet side of the cells. There is a ledge over each cylindrical opening and each ledge is about the width of a cell.

The front side of the front panel also has a plurality of pairs of vertical dogs 70 projecting therefrom at the upper section thereof. Each pair of vertical dogs forms a slot for receiving the ends of the filter cell sheets. The dogs have perforations 71 therein which are aligned with the perforations 54 in the edges of the cell sheets. The front side of the front panel also has another plurality of pairs of vertical dogs 72 projecting from the lower surface thereof having perforations 73 also for receiving the ends of the filter cell sheets. The lower dogs are aligned with the upper dogs and function in the same manner as the upper dogs. The dogs are located between the cylindrical openings in the front panel. Other keying means beside a pair of dogs forming a slot may be used for attaching the effluent port means to the cell sheets.

Figure 6:
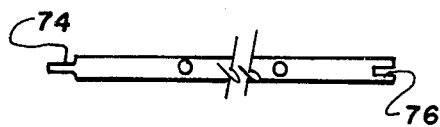
FIG. 6 is a bottom view of part of the port means or filtrate outlet means of the present invention showing how adjacent port means are interconnected.
Figure 7:
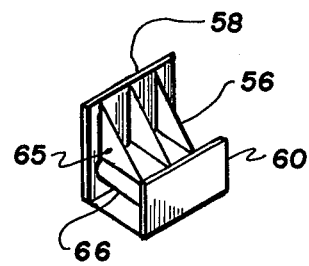
FIG. 7 is a perspective view showing a port means module of the present invention.

With reference to FIG. 6 the front and rear panels also have a tongue 74 at one end thereof and a groove 76 at the other end thereof for attaching adjacent effluent port means together. It is within the scope of this invention to use other means for attaching adjacent effluent port means.

The effluent port means preferably contains three ports, however, it is within the scope of this invention to use port means that only have two ports or more than three ports. The offset surface of the rear panel of the port means provides a smooth surface for cooperation with the backwash means. The length of the port means from front to back is adjusted to be the same as the thickness of the concrete wall forming the end of the filtering section of the filter. This is usually about 12 inches. The panels of the effluent port means form part of the form for pouring the concrete wall and are flush with the finished surface of the concrete wall.

The front and rear panels are generally about 1 inch thick and the cylindrical parts are about ¾ inches thick. The dogs project out about 1 inch from the surface of the front panel and are about ½ inch thick. The shoulder projects out about ½ inch and is about ½ inch thick. The filtrate port module has only one of the pair of vertical dogs projecting along the edge thereof so that it can cooperate with a singular dog on an adjacent module for forming cell sheet receiving slot. This enables the adjacent modules to be connected when the cell sheet is attached.

The effluent port means closes off one end of the filter cells and allows for passage of the filtrate to the effluent channel. The effluent port means are fabricated from a suitable plastic material by injection molding. The preferred materials are polypropylene or glass-reinforced polyester. All of the parts of the effluent port means are preferable molded as one integral unit. The effluent port means serves many purposes in the filter, such as (1) positioning the porous support plates at the end of the cell; (2) allows passage of the filtered liquid from the treated liquid receiving means into the effluent channel; (3) provides a smooth, flat surface for the backwash means to cooperate with, thus forming an important part of the backwash means; (4) provides for attachment of the cell sheets to the side wall with predetermined spacing; and (5) is part of the form used for pouring the concrete side wall. The effluent port means has combined the function of 32 individual pieces into one.

Figure 9:
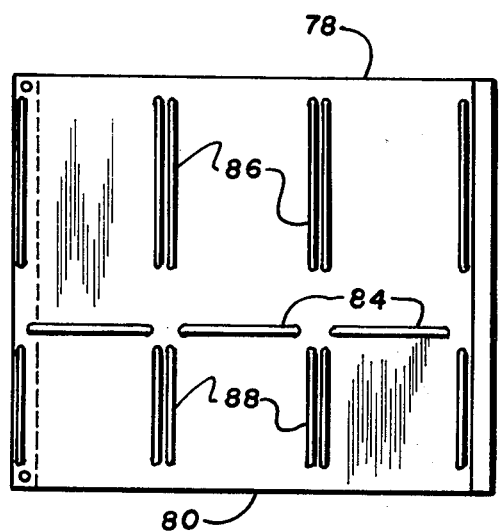
FIG. 9 is an end view of the cell end panel of the cell system of the present invention.
Figure 8:
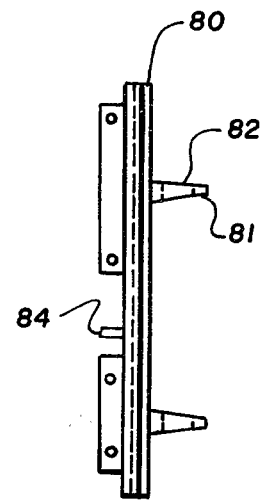
FIG. 8 is a side view of the cell end section or panel of the cell system of the present invention.

With respect to FIGS. 8 and 9 there is illustrated one of a plurality of end cell sections or end cell panels of the cell system of the present invention.

The end cell section 78 comprises a rectangular panel 80 having a plurality of tapered rectangular projections 81 extending from the rear surface thereof. The tapered projections have a large perforation 82 in the center thereof. The rear projections with perforations are for rigidly holding the end cell section in the interior concrete wall forming the influent channel. The front side of the panel has a plurality of horizontal ledges 84 extending therefrom. The horizontal ledges in the end cell are similar to the horizontal ledges 68 in the effluent port means.

The front side of the end cell panel also has a plurality of pairs of vertical dogs 86 projecting from the upper part of the panel. Each pair of vertical dogs form a slot for receiving the end of a cell sheet. The dogs have perforations therein for attachment to the ends of the cell sheets. The front side of the end cell panel also has a plurality of pairs of vertical dogs 88 projecting from the lower surface thereof in alignment with the upper dogs. The lower dogs also having perforations therein. The dogs in the end cell work in the same manner as the pairs of dogs 70 and 72 in the effluent port means.

The edges of the end cell panels also have means for attaching the end cell panels to adjacent end cell panels. This may be done by a tongue and groove means as illustrated for effluent port means. The end cell panels may also be attached by any other suitable means such as by matched tapered ends.

The end cell panels close off the filter cells at the end near the influent channel. The end cell panels are preferably fabricated from polypropylene or glass-reinforced polyesters by injection molding. All of the parts are molded as one integral piece. The end cell panels are designed to position the porous support plates, to be part of the form used in pouring the concrete wall, to be appendages for locking the end sections into the concrete wall and to provide for attachment of the cell sheets to the side walls with predetermined spacing. The end cell panel has been designed to take the place of 24 pieces of prior art material.

Figure 10:
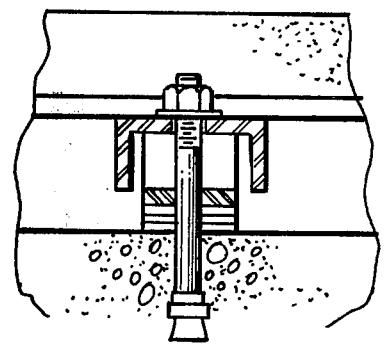
FIG. 10 is an expanded end view of a leveling strip useful in installing the cell system of the present invention.
Figure 11:
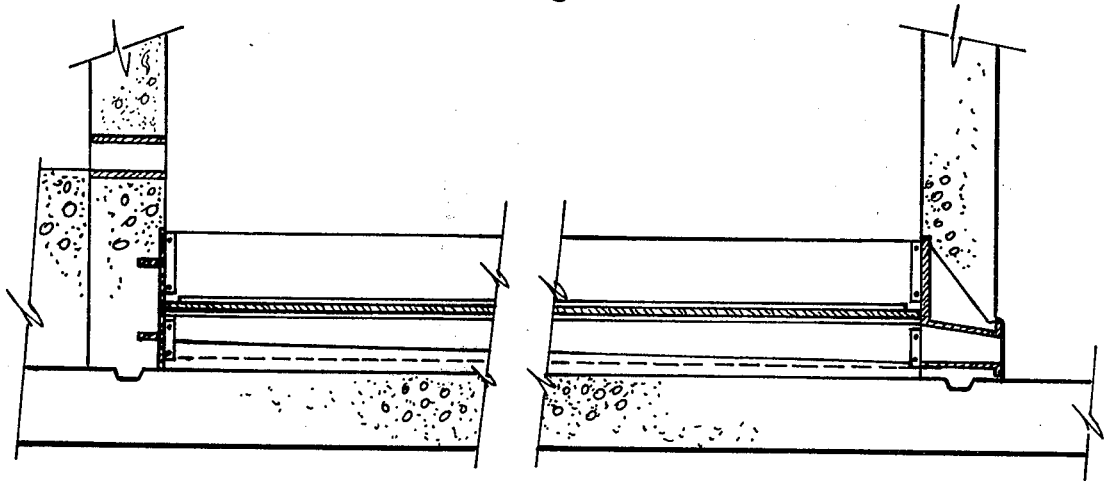
FIG. 11 is a side view of a filter showing the cell system of the present invention installed in a filter.

With respect to FIG. 10 there is illustrated a leveling strip useful in the present invention. The leveling strip 90 is a U shaped channel member that is bolted to the floor of the filter and leveled with spacers or shims as is custom in the art. The leveling strips are pre-punched with holes that are aligned with the holes in the foot means of the cell sheet. In this manner, the cell sheets are easily attached to the leveling strips such as by a self-tapping screw or other similar keying means. The leveling strips are preferably made from polypropylene or reinforced polyester and can be made by the pull-extrusion process or by molding.

As mentioned above, the lightweight prefabricated cell system of the present invention provides many installation advantages over the filter of the prior art. These advantages may be more readily seen by a comparison of the installation of the prior art filter and the installation of a filter having the cell system of the present invention. For the sake of brevity, the description of standard parts such as the concrete base and the description of parts that are the same such as the backwash mechanism will not be described. The installation of a prior art filter will be discussed first followed by that of the present invention.

A gravity type sand filter structure is illustrated in FIG. 1. It consists of a filter tank, a compartmented filter bed and underdrain, and the filter media. The installation of such a filter is discussed below.

The filter tank is constructed of reinforced concrete and consists of a slab floor, four containing walls and two interior channel walls which divide the tank into three compartments. The central compartment contains the filter bed and underdrain, and the two adjacent compartments the influent and effluent channels. Influent ports are located in the interior wall between the influent channel and the filter bed. The combined fitrate effluent and backwash ports are in the wall between the filter bed and the effluent channel. Influent, effluent and washwater discharge pipes are provided in the base wall common to all three compartments.

The compartmented filter bed consists of a series of laterally positioned metal cell sheets assembled to divide the filter bed into eight-inch wide compartments. One end of each compartment is sealed by the construction of the influent channel interior wall and the opposite end terminated with a filtrate effluent and backwash port imbedded in the interior effluent channel wall. Vertically, between the cell sheets, a porous plate underdrain is installed which supports and separates the filter media from the underdrain channel through which the filtrate flows to the effluent channel. All metal parts that come into contact with the filtrate must be coated with special finishes.

After the floor of the filter is completed, the leveling strips are installed. These strips are used to provide a level platform for installation of the filter cells. They are supplied in 20-foot lengths with shorter lengths included as determined by filter length. All leveling strips are predrilled with 7/16-inch diameter holes for attaching to slab floor with anchor bolts. They are installed as follows:

a. Using a chalk line, mark off the side-to-side and end-to-end center lines of the filter bed.

b. From the above center lines, mark center lines for the leveling strips in accordance with the given dimensions shown.

c. Place the leveling strips on the center lines insuring the lines are visible through the predrilled holes of the strips.

d. Using a size ⅜ inch masonry drill, drill through the holes of the leveling strip into the concrete to a depth of one inch.

e. Insert anchor bolts into prepared holes and tap into place.

f. Beginning at the highest elevation of the slab, place a ½ inch thick shim under the leveling strip and then level the entire length of both strips to an accuracy of ±1/16 inch. Use shims, placed at each bolt and at intermediate positions between bolts, on approximate 3-foot centers.

g. Insure all anchor bolt nuts are securely fastened before proceeding to next step. When the leveling strips are in place the cell system is installed.

A single cell assembly consists of two cell sheets; two lower support angles and four angle clips mounted on the cell sheets; two end channels, one blank and one with a port hole; two short support angles for mounting on the end channels, tie rod bolts and attaching hardware. Narrow end channels marked and spacers are also necessary for reducing or increasing channel width to maintain the correct overall length of the filter bed. To install the cell assembly proceed as follows:

a. Mark center line of filter on both leveling strips.

b. Determine if total number of cells will be odd or even.

c. If number is odd, mark-off four inches right and left on leveling strips and further mark-off increments of eight inches in both directions from the four-inch marks.

d. If number is even, mark-off increments of eight inches in both directions from the center line. It should be noted that extreme care should be exercised in the handling of the finished coated and specially prepared materials to avoid damage to protective coatings.

e. Align and attach two angle clips with the necessary hardware provided to the base of each of two cell sheets. Fasten attaching hardware securely.

f. Assemble the parts described in E above into a filter cell using the required hardware.

g. Attach two support angles on opposite sides of each of the two cell sheets as shown with tie rod bolts using lower level of holes. Position first tie rod bolt in first hole of the cell sheet and the remaining bolts in every other hole.

h. Align cell, insuring square corners, level base and tighten all hardware to provide a rigid assembly.

i. Adjust and tighten tie rod bolt and nuts after insuring support angles are aligned and center-to-center dimension of cell sheets is 8 inches.

j. Assuming an even number of cells, align either one of the two cell sheets of the prepared assembly with the center line marked on the two leveling strips. Initially, tack weld only the first four assembled cell sheets to the leveling strips. The remaining angle clips are welded after completion of the cell assembly installation.

k. Continue to assemble cells by connecting one cell sheet with angle clip attached, and two end channels alternately to either end of the assembly.

l. As each cell is assembled, attach support angles, one on either side of each cell sheet (except final two cell sheets), by placing tie rod bolts through unused hole positions (lower level of holes) of previously installed cell sheets and corresponding holes of added cell sheets.

m. Adjust and tighten tie rod bolt and nuts after each new cell addition first insuring all support angles are level, aligned and center-to-center dimension of cell sheets is 8 inches. If the cell sheet separation becomes less than 8 inches center-to-center, use spacers to maintain proper spacing. If the cell sheet separation increases, use narrow end cells to maintain proper spacing.

n. Position the angle clips on the final cell sheet at either end of the assembly so that they will be imbedded in the filter wall when poured. Attach these cell sheets to the already assembled end channels.

o. Install both support angles and upper holddown angles on the cell side of each of the final cell sheets using the total number of tie rod bolts and cap screws required.

p. Insure these cell assemblies are properly spaced and aligned before tightening the tie rod bolts and cap screws. Installation of the upper holddown angles on the two end cell sheets is a temporary measure to allow imbedding the bolt heads in the poured concrete end step.

q. Attach short support angles, one to each of the blank end channels, and one to each of the end channels with opening, with attaching hardware.

r. Insure the completed cell assembly is properly aligned, leveled and securely fastened, then tack weld the four angle clips on the final cell sheets to the extension of the leveling strips. After the cell sheets are installed, the effluent port means are installed.

This assembly consists of the backwash channel sections, effluent filtrate cones, and steel washers. The cones are conical in shape and fit between the end channel and backwash channel section. They have two tabs or stops located on the narrow end which limit the depth the cone will penetrate into the backwash channel section. This washer is also fitted with two tabs which are crimped to hold the cone in position once aligned. To assemble, proceed as follows:

a. Adjust leveling screws to protrude 15/16-inches below base of backwash channel section.

b. Temporarily position the sections of backwash channel on the slab, insuring openings in same align with the openings in the completed cell assembly along its entire length.

c. Starting at center, or either end of cell assembly, carefully align openings of each section of backwash channel with openings of end channel insuring a separation between the two equal to the designed width of the wall.

d. Readjust the leveling screws as required to make contact with the slab floor and accurately level the backwash channel section without disturbing alignment with cell assembly.

e. Inspect re-bar locations to insure they will not interfere with installation of filtrate cones. Modify, if required.

f. When properly aligned and leveled, brace the backwash channel section to prevent further movement. The backwash channel sections can be temporarily fixed in position or braced by tack welding to selected rebars either directly or with a small section of re-bar.

g. Install each section of backwash channel using procedures described above.

h. Bend tabs on washer 90° to surface.

i. Position washer against backwash channel side of end channel with tabs protruding into cell.

j. Insert narrow end of filtrate cone from cell assembly through end channel and washer and position in backwash channel section opening to depth limited by metal tabs.

k. Properly align filtrate cone and then fasten in place by bending and crimping tabs.

l. Continue installation until all filtrate cones are fitted in place.

When the cell sheets and effluent port means are completed the porous plates are installed to support the filter media and provide an underdrain for filtering and backwash operations. Care must be exercised in installation to obtain a perfect seal between plates and cell to prevent sand leaks which will reduce filter efficiency. To install porous plates, proceed as follows:

a. Remove holddown angles temporarily installed.

b. Remove all debris from the backwash channel cells and ports. The cement used in these procedures is prepared in two different mixtures: a trowelling mixture, for buttering the butt joints between porous plates and sealing the four corners of each cell; and a thinner mixture that can be applied with a caulking gun. The manufacturer's instructions for mixing are provided with the cement.

d. Butter the butt ends of each porous plate with a trowelling mixture of cement.

e. Beginning at either end of the cell assembly, lay the porous plate on the angle supports butted against the end cell.

f. Continue laying the porous plates, first buttering the butt ends, until the cell layer is complete.

g. Insure that a tight fit exists between each plate and between the plate layer and the cell walls.

h. Using the trowelling mixture, completely seal the four corners of the cell.

i. Applying the thinner mix with a caulking gun, completely seal the joints between the plate layer and the cell walls. Avoid spilling any excess cement on the face of the porous plates.

j. Inspect each cell, as completed, for a perfect seal of cement between plates and between plate layer and cell walls.

k. Install holddown angles before cement is set using hex head cap screws inserted in hole locations parallel to the support angle attachments.

l. Continue installation of plates and holddown angles until the cell assembly is completed.

m. Inspect completed assembly for completeness of seal, secure fastening of holddown angles and absence of excess cement on plate surfaces.

The following is a description of the installation of a filter using the cell system of the present invention.

During the construction of the floor slab proceed as follows:

a. Prepare and position forms to construct floor slab conforming to the dimensions specified.

b. Locate and position reinforcement bars for the tank walls. Reinforcement bars (re-bars) for the wall dividing the effluent channel and filter tank must be positioned so that they will not interfere with the placement of the filtrate outlet sections. Also, note position of reinforcement bars change depending upon the use of an odd or even number of cells in filter construction. With an even number of cells, re-bars start out centerline of filter and are placed on 8-inch centers. With an odd number of cells, re-bars start 4 inches either side of centerline of filter and continue on 8-inch centers. Pour concrete slab to depth shown in specifications.

The leveling strips of the present invention are then installed. These strips are used to provide a level platform for installation of the filter cell sheets. They are supplied in 19'8" lengths with shorter lengths included as determined by filter length. All leveling strips are prepunched with 7/16-inch wide by 4-inch long slots for attaching to slab floor with anchor bolts (FIG. 10). To install, proceed as follows:

a. Using a chalk line, mark off the side-to-side and end-to-end centerlines of the filter bed.

b. From the above centerlines, mark off the centers for the leveling strip anchor bolts in accordance with dimensions. Care must be taken that the centers are on two parallel lines and spaced the proper distance apart.

c. Using a 3/8-inch masonry drill, drill holes into concrete to a depth of 1-inch.

d. Insert anchor bolts into prepared holes and tap into place.

e. Place one leveling strip spacer over each anchor bolt. Then place the leveling strips over the leveling strip spacers in accordance with dimensions. Do not tighten nuts at this time.

f. Beginning at the highest elevation of the slab, place a ⅛ inch thick shim under the leveling strip spacer and then level the entire length of both strips to an accuracy of ±1/16-inch. Use shims placed at each bolt and at intermediate positions between bolts on approximately 3-foot centers.

g. Insure all anchor bolt nuts are securely fastened before proceeding to next step. The cell assembly is then erected. A single two-foot cell assembly consists of three cell sheets: one filtrate outlet section, one end cell section, and attaching hardware. To install the cell assembly, proceed as follows:

a. Mark centerline of filter on both leveling strips.

b. Determine if total number of cells will be odd or even by dividing total length of filter bed in inches by eight.

c. If the number of cells is odd, distance from filter centerline to the closest prepunched hole should measure 3⅛ inches with the hole in the opposite direction from the centerline measuring 4⅞ inches.

d. If the number of cells is even, distance from filter centerline to closest prepunched hole should measure ⅞ inch, with the hole in the opposite direction from the centerline measuring 7⅛ inches.

e. If the number of cells is odd, fasten two cell sheets to the leveling strip using self-tapping screws. One cell sheet should be fastened to each side of the filter centerline so that the distance to the center of the vertical leg is 4 inches. Note all toes of the cell sheet point in the same direction and the distance between cell sheets centerline is 8 inches.

f. If the number of cells is even, fasten two cell sheets to the leveling strip using self-tapping screws. The first cell sheet should be fastened at holes measuring 7⅛ inch and with the toe pointed toward the filter centerline. The second cell sheet should be fastened at the next set of holes measuring 15⅛ inches from the centerline of the filter. The distances from the filter centerline to the center of the vertical leg of each cell sheet is 8 and 16 inches.

g. Align cell sheets, insuring that the cell sheets are perpendicular to the leveling strips. If they are not, loosen the leveling strip anchor bolts and position leveling strip so that the cell sheets are perpendicular. Tighten all hardware.

h. Install two leveling screws in all of the filter outlet sections. Take one filtrate outlet section and caulk the two center slots using a caulk/adhesive. Place filtrate outlet section over the re-bars and push up against the two cell sheets and secure with anchors.

i. Insure that the filtrate outlet section is square to the cell sheets and the rear face is vertical and level.

j. Install the end cell section, first caulk the two center slots and then press onto the two cell sheets and secure with anchors. Insure that the end cell section is vertical and is square to the cell sheets.

k. Proceeding in either direction, install the next cell sheet by fastening it to the leveling strips using the self-tapping screws.

l. Next, caulk the filtrate outlet section with the caulk/adhesive and position the next filtrate outlet section in place and fasten with the anchors. Now caulk the two center slots as before and install the next two cell sheets by fastening to the leveling strips and the filtrate outlet sections.

m. Level the just installed filtrate outlet section with two screws located in its lower rear face.

n. Install an alignment tool on the rear face of the previously installed filtrate outlet section. Next install a positioning tool between the two filtrate outlet sections. Now clamp the last installed filtrate outlet section to the alignment tool.

o. Insure that the filtrate outlet sections' rear faces are up tight against the alignment tool. Match drill two ¼-inch holes in rear face and install spring pins.

p. Repeat steps "n" through "o" until both ends of the filter are reached.

q. Caulk one end cell section at a time as shown and install on the end of the cell sheets. Repeat process until ends of filter are reached. Filtrate outlet sections and end cell sections should extend two feet beyond end of cell sheets.

r. Install holddown angles on the cell side of each of the final cell sheets using hex nuts and washers. Make sure all screws are located with the heads outside of the cell.

The porous plates are then installed as in the prior art. From the above it can readily be seen how the cell system of the present invention greatly facilitates the installation of multi cell granular filters.

What is claimed is:

1. An improved granular media filter of the type including a filter tank, means for dividing the tank into a plurality of cells, means within each cell for holding horizontal porous support plates, a bed of filter media on the porous support plates, influent means for delivering fluid to be treated to the top of the filter bed, filtrate receiving means in each cell below the support plates for receiving the treated fluid, an effluent channel for removing the treated liquid from the filter, port means for delivering the treated liquid from each filtrate receiving means to the common effluent channel and backwashing means that cooperate with the port means to force a backwashing liquid back through the port means and filtrate receiving means and up through the filter bed for removing contaminants therein and thereon wherein the improvement comprises a prefabricated lightweight plastic cell system that divides the filter into the plurality of cells, provides the horizontal support means for the porous plates, provides the filtrate receiving means and provides the port means, the plastic cell system comprising:

a. a plurality of cell sheets for dividing the filter into the plurality of cells, each cell sheet having integral horizontal shoulders protruding from each side and extending the length for supporting the porous filter plates, each cell sheet having integral foot means for attaching the cell sheet to the base of the filter, each cell sheet having a plurality of holes evenly spaced along the length thereof above the shoulder for attaching a filter plate holding means and each cell sheet having a plurality of holes spaced along each vertical edge thereof for attaching the cell sheets to the ends of the filter;

b. a plurality of port means attached to one end of the cell sheets and connecting the cell sheets at one end thereof and providing ports between the filtrate receiving means and the effluent channel, each port means comprising a rectangular front panel having a plurality of circular openings, a rectangular rear panel having a plurality of circular openings corresponding to the openings in the front panel, a plurality of cylindrical tubes extending from the openings in the front panel to the openings in the rear panel, a reinforcing plate extending from the front panel to the rear panel above each tube, a plurality of horizontal ledges projecting from the front side of the front panel above each circular opening for supporting the porous filter plates, a plurality of pairs of vertical dogs projecting from the front side of each port means, each pair of dogs forming a slot for receiving the ends of the cell sheets and each pair of dogs having a plurality of holes for attaching the cell sheets, the front panel and rear panel also having a tongue at one end thereof and a groove at the other end thereof for attachment to adjacent port means;

c. plurality of end cell panels attached to the other end of the cell sheet and connecting the ends of the cell sheet together comprising a rectangular panel having a plurality of means extending from the rear side thereof for holding the end cell sheets in the filter tank wall, a plurality of horizontal ledges projecting from the front side of the end cell panel for holding the porous plates, a plurality of pairs of vertical dogs projecting from the front side of each end cell panel, each pair of dogs forming a slot for receiving the ends of the cell sheets and each pair of dogs having a plurality of holes for attaching the cell sheets, and each end cell panel having means at the edges thereof for attachment to adjacent end cell means.

2. An improved filter as in claim 1 wherein each port means is made as an integral unit.

3. An improved filter as in claim 2 wherein each end cell panel is made as an integral unit.

4. An improved filter as in claim 1 wherein each end cell panel is made as an integral unit.

5. An improved granular media filter of the type including a filter tank, means for dividing the tank into a plurality of cells, means within each cell for holding horizontal porous support plates, a bed of filter media on the porous support plates, influent means for delivering fluid to be treated to the top of the filter bed, filtrate receiving means in each cell below the support plates for receiving the treated fluid, an effluent channel for removing the treated liquid from the filter, port means for delivering the treated liquid from each filtrate receiving means to the common effluent channel and backwashing means that cooperate with the port means to force a backwashing liquid back through the port means and filtrate receiving means and up through the filter bed for removing contaminants therein and thereon, wherein the improvement comprises a prefabricated lightweight plastic cell system that divides the filter into the plurality of cells, provides the horizontal support means for the porous plates, provides the filtrate receiving means and provides the port means, the plastic cell system comprising:

(a) a plurality of cell sheets for dividing the filter into the plurality of cells, the cell sheets having integral horizontal shoulders protruding from each side and extending the length thereof for supporting the porous filter plates, the cell sheets having integral foot means for attaching the cell sheets to the base of the filter tank, the cell sheets having a plurality of holes spaced along the length thereof above the horizontal shoulders for attaching a filter plate holding means and the cell sheets having means along each vertical edge thereof for attaching the sheets to the ends of the cells;

(b) a plurality of port means attached to one end of the cell sheets and connecting the cell sheets at one end thereof and providing ports between the filtrate receiving means and the effluent channel, the port means comprising a front panel having a plurality of openings, a rear panel having a plurality of openings corresponding to the openings in the front panel, a plurality of tubes extending from the openings in the front panel to the openings in the rear panel, means on the front side of the front panel for attaching the port means to the ends of the cell sheets, means on each vertical side of the port means for attaching adjacent port means together; and (c) a plurality of end cell panels attached to the other end of the cell sheets and connecting the cell sheets at the other end thereof, the end cell panels comprising a panel having means on the front side thereof for attaching the end cell panels to the ends of the cell sheets and means on each vertical side of the end cell panels for attaching the adjacent end cell panels together.

6. An improved filter as in claim 5 wherein the means for attaching the cell sheets to the ends of the cells comprises a plurality of holes spaced along each vertical edge of the cell sheets.

7. An improved filter as in claim 5 wherein the port means have a rectangular-shaped front and rear panel, circular openings, cylindrical tubes reinforcing plates above each tube extending from the front to rear panel.

8. An improved filter as in claim 5 wherein the port means have a plurality of horizontal ledges projecting from the front of the front panel above each opening for supporting the porous filter plates.

9. An improved filter as in claim 5 wherein the means on the front side of the front panel of the port means for attaching the port means to the cell sheets comprises a plurality of pairs of vertical dogs projecting from the front side of the front panel, each pair of dogs forming a slot for receiving the ends of the cell sheets and each pair of dogs having a plurality of holes for attaching the port means to corresponding holes in the vertical edges of the cell sheets.

10. An improved filter as in claim 5 wherein the means on each vertical side of the port means for connecting adjacent port means together comprises the front and rear panel of the port means and having a tongue at one end thereof and a groove at the other end thereof for cooperation with a similar tongue and groove on adjacent port means.

11. An improved filter as in claim 5 wherein the port means comprises a rectangular front panel having a plurality of circular openings, a rectangular rear panel of smaller height than the front panel having a plurality of circular openings corresponding to the openings in the front panel, a plurality of cylindrical tubes extending from the openings in the front panel to the openings in the rear panel, a reinforcing plate extending from the front panel to the rear panel above each tube, a plurality of horizontal ledges projecting from the front side of the front panel above each circular opening for supporting the porous filter plates, a plurality of pairs of vertical dogs projecting from the front side of each port means, each pair of dogs forming a slot for receiving the ends of the cell sheets and each pair of dogs having a plurality of holes for attaching the cell sheet, the front panel and rear panel also having a tongue at one vertical end thereof and a groove at the other vertical end thereof for attachment to adjacent port means.

12. An improved filter as in claim 11 wherein the rear surface of the rear panel of the port means provides a surface for engagement with the backwash means.

13. An improved filter as in claim 5 wherein the end cell panels have a plurality of means projecting from the rear side thereof for holding the end cell panels in the filter tank wall.

14. An improved filter as in claim 15 wherein the end cell panels have a plurality of horizontal ledges projecting from the front side of the panel for holding the porous plates.

15. An improved filter as in claim 5 wherein the means on the front side of the panel for attaching the end cell panels to the cell sheets comprise a plurality of vertical dogs projecting from the front side of the panel, each pair of dogs forming a slot for receiving the ends of the cell sheets and each pair of dogs having a plurality of holes for attaching the end cell panels to corresponding holes in the vertical edges of the cell sheets.

16. An improved filter as in claim 5 wherein the end cell panels have a plurality of means projecting from the rear side thereof for holding the end cell panels in the filter tank wall, the end cell panels also have a plurality of horizontal ledges projecting from the front side of the panel for holding the porous plates and wherein the means for connecting the end cell panels to the cell sheets comprise a plurality of vertical dogs projecting from the front side of the panel, each pair of dogs forming a slot for receiving the ends of the cell sheets and each pair of dogs having a plurality of holes for attaching the cell sheets to the end cell panels, and wherein the means for attaching adjacent end cell panels comprise a tongue on one vertical end of a groove at the other vertical end.

17. An improved granular media filter of the type including a filter tank, means for dividing the tank into a plurality of cells, means within each cell for holding horizontal porous support plates, a bed of filter media on the porous support plates, influent means for delivering fluid to be treated to the top of the filter bed, filtrate receiving means in each cell below the support plates for receiving the treated fluid, an effluent channel for removing the treated liquid from the filter, port means for delivering the treated liquid from each filtrate receiving means to the common effluent channel and backwashing means that cooperate with the port means to force a backwashing liquid back through the port means and filtrate receiving means and up through the filter bed for removing contaminants therein and thereon, wherein the improvement comprises a prefabricated lightweight plastic cell system that divides the filter into the plurality of cells, provides the horizontal support means for the porous plates, provides the filtrate receiving means and provides the port means, the plastic cell system comprising:

(a) a plurality of cell sheets for dividing the filter into the plurality of cells, the cell sheets having means extending along each side for supporting the filter plates, the cell sheets having foot means for attaching the cell sheets to the base of the filter, the cell sheets having means for holding the filter plates in position and the cell sheets having means along each vertical edge thereof for attaching the cell sheets to the ends of the cells;

(b) a plurality of port means attached to one end of the cell sheets and connecting the cell sheets at one end thereof and providing ports between the filtrate receiving means and the effluent channel, the port means comprising a front panel having a plurality of openings, a rear panel having a plurality of openings corresponding to the openings in the front panel, a plurality of tubes extending from the openings in the front panel to the openings in the rear panel, means on the front side of the front panel for attaching the port means to the ends of the cell sheets comprising a plurality of pairs of vertical dogs projecting from the front side of the front panel, each pair of dogs forming a slot for receiving the ends of the cell sheets and each pair of dogs having a plurality of holes for attaching the port means to corresponding holes in the vertical edges of the cell sheets, means on each vertical side of the port means for attaching adjacent port means together; and (c) a plurality of end cell panels attached to the other end of the cell sheets and connecting the cell sheets at the other end thereof, the end cell panel comprising a panel having means on the front side thereof for attaching the end cell panels to the ends of the cell sheets and means on each vertical side of the end cell panels for attaching adjacent end cell panels together.

18. An improved filter as in claim 17 wherein the means on each vertical side of the port means for connecting adjacent port means together comprises the front and rear panel of the port means having a tongue at one end thereof and a groove at the other end thereof for cooperation with a similar tongue and groove on adjacent port means.

19. An improved filter as in claim 18 wherein the port means comprises a rectangular front panel having a plurality of circular openings, a rectangular rear panel of smaller height than the front panel having a plurality of circular openings corresponding to the openings in the front panel, a plurality of cylindrical tubes extending from the openings in the front panel to the openings in the rear panel, a reinforcing plate extending from the front panel to the rear panel above each tube, a plurality of horizontal ledges projecting from the front side of the front panel above each circular opening for supporting the porous filter plates.

* * * * *